United States Patent
In et al.

(10) Patent No.: US 7,594,062 B2
(45) Date of Patent: Sep. 22, 2009

(54) METHOD FOR CHANGING DATA OF A DATA BLOCK IN A FLASH MEMORY HAVING A MAPPING AREA, A DATA AREA AND AN ALTERNATIVE AREA

(75) Inventors: Ji-hyun In, Seoul (KR); Dong-hee Lee, Seoul (KR); Bum-soo Kim, Gyeonggi-do (KR); Sung-kwan Kim, Seoul (KR); Song-ho Yoon, Gyeonggi-do (KR)

(73) Assignees: Samsung Electronics., Ltd., Suwon-si (KR); Zeen Information Technologies, Inc., Seoul (KR)

( * ) Notice: Subject to any disclaimer, the term of this patent is extended or adjusted under 35 U.S.C. 154(b) by 255 days.

(21) Appl. No.: 10/626,839

(22) Filed: Jul. 25, 2003

(65) Prior Publication Data

US 2004/0210706 A1    Oct. 21, 2004

(30) Foreign Application Priority Data

Jul. 26, 2002    (KR) .................... 10-2002-0044301

(51) Int. Cl.
*G06F 12/00*    (2006.01)
(52) U.S. Cl. .................. 711/103; 711/154; 711/170
(58) Field of Classification Search .................. 711/103
See application file for complete search history.

(56) References Cited

U.S. PATENT DOCUMENTS

| | | | | | |
|---|---|---|---|---|---|
| 5,404,485 | A | * | 4/1995 | Ban | 711/202 |
| 5,479,638 | A | * | 12/1995 | Assar et al. | 711/103 |
| 6,587,915 | B1 | * | 7/2003 | Kim | 711/103 |

FOREIGN PATENT DOCUMENTS

| | | | |
|---|---|---|---|
| GB | 2291990 A | * | 2/1996 |
| KR | 2000-0047570 A | | 7/2000 |

* cited by examiner

*Primary Examiner*—Kevin L Ellis
*Assistant Examiner*—Matthew Bradley
(74) *Attorney, Agent, or Firm*—Sughrue Mion, PLLC

(57) ABSTRACT

A method for flash memory management where, if changing of data of a data block recorded in a data area is requested, recording the data block having changed data in an alternative area and recording mapping information representing an address of the data block recorded in the alternative area in a mapping area. If changing of data of the data block recorded in the alternative area is requested, recording a data block having changed data in the data area and deleting the mapping information representing the address recorded in the alternative area from the mapping area. If the mapping information on the data block exists in the mapping area, data is read from the data block in the alternative area, and if the mapping information on the data block does not exist in the mapping area, data is read from the data block at the original address in the data area.

10 Claims, 14 Drawing Sheets

ENTIRE MAPPING TABLE

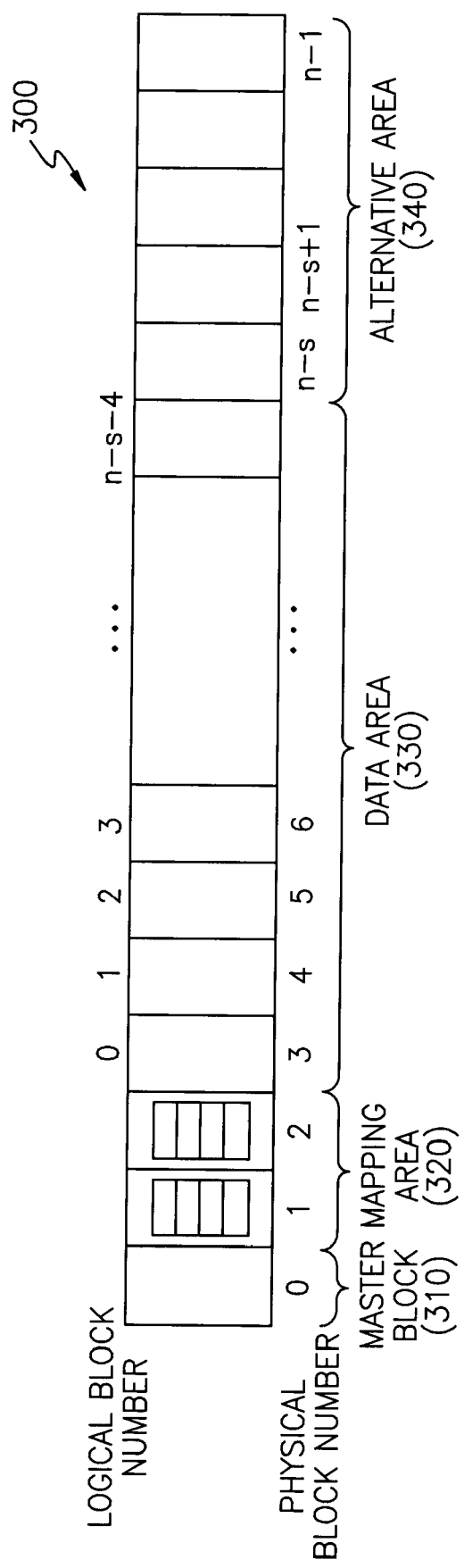

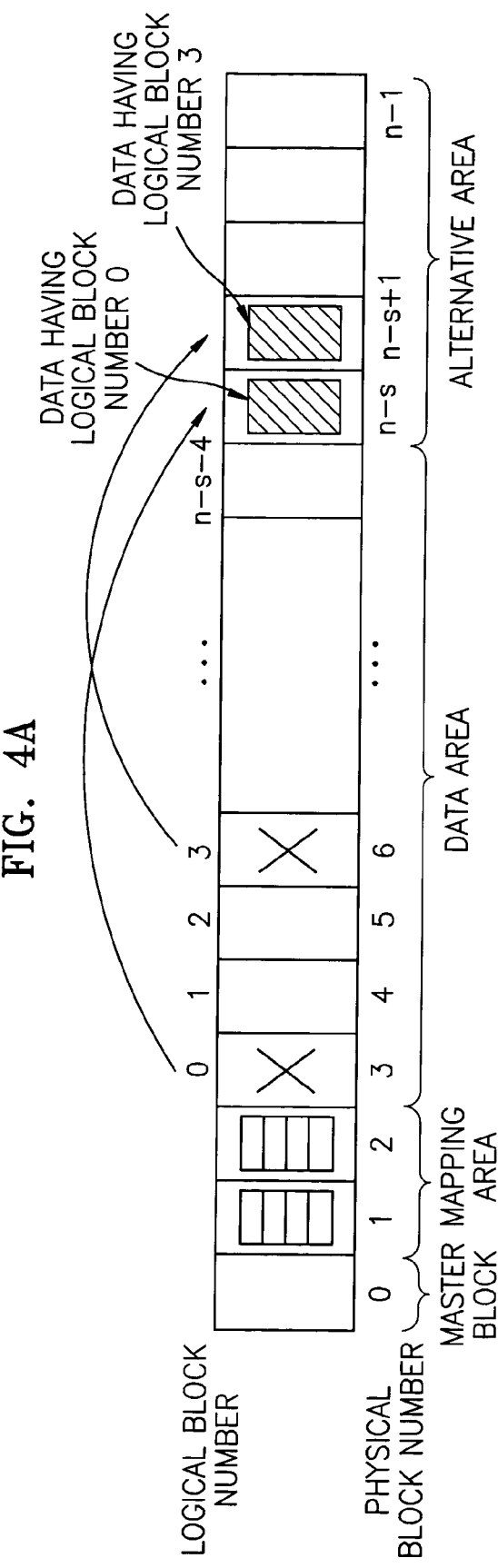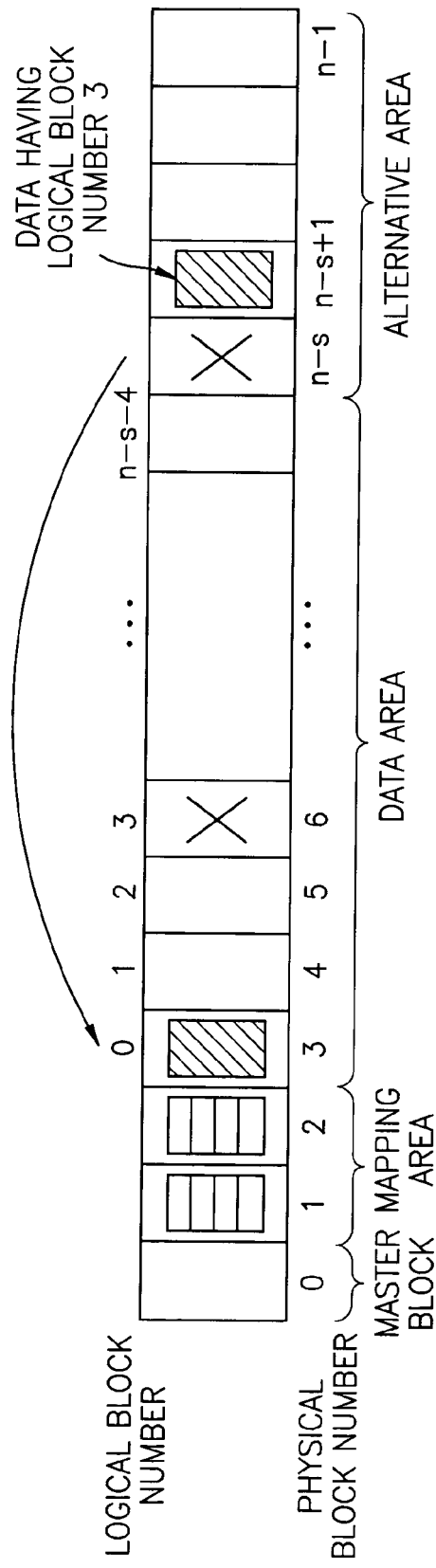

FIG. 5
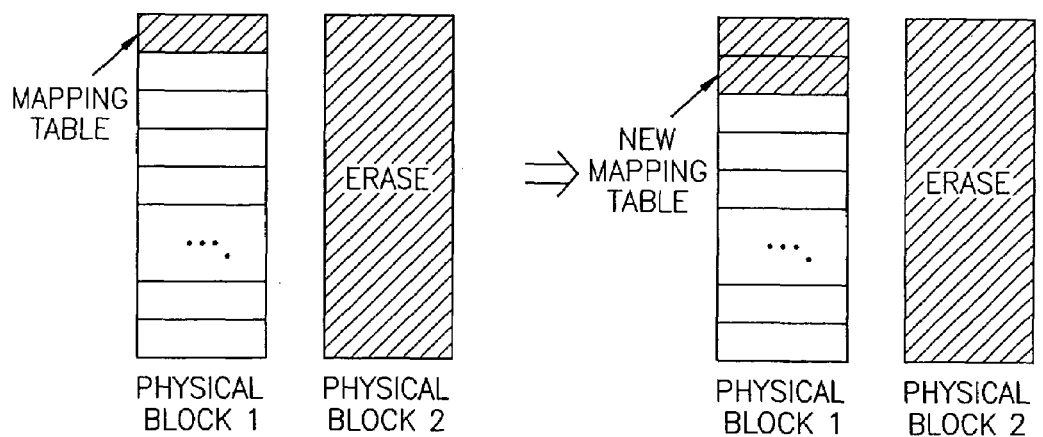
FIG. 6A
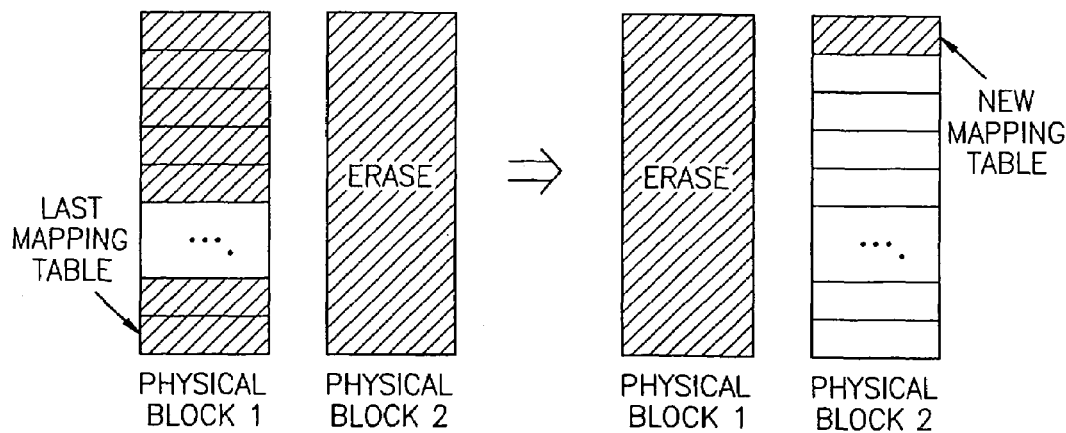
FIG. 6B

METHOD FOR CHANGING DATA OF A DATA BLOCK IN A FLASH MEMORY HAVING A MAPPING AREA, A DATA AREA AND AN ALTERNATIVE AREA

BACKGROUND OF THE INVENTION

This application claims the priority of Korean Patent Application No. 2002-44301, filed on Jul. 26, 2002, in the Korean Intellectual Property Office, the disclosure of which is incorporated herein in its entirety by reference.

1. Field of the Invention

The present invention relates to a method for managing a flash memory, a method for leveling the wear of blocks in a flash memory, and a method for managing a file system for a flash memory.

2. Description of the Related Art

A flash memory is a type of highly-integrated nonvolatile memory that can be electrically erased and reprogrammed. The flash memory has not only the advantage of a read only memory (ROM) that can be freely recorded and deleted, but also the advantage of a random access memory (RAM) that can save stored data even when power is removed. Thus, these days, the flash memory is widely used as a storage medium in portable electronic products such as digital cameras, personal digital assistants (PDAs), or MP3 players.

The flash memory is very different from other existing memory in that memory data are changed through electrical erasure and programming and this changing of memory data is non-atomic. In an initial state, each bit of a flash memory has a value of 1. Also, in order to record data in a predetermined location, one bit can be changed from 1 to 0. However, a bit recorded as 0 cannot be restored to 1. Thus, in order to change data recorded in a predetermined location, only when a predetermined amount of a memory block containing a corresponding location is reinitialized to 1 after undergoing electrical erasure, data can be recorded again.

When a file system performs a write operation directly using a physical address of the flash memory without performing a predetermined function of mapping blocks, memory required to map blocks can be saved. However, in this case, due to the non-atomic characteristics of changing of the flash memory, problems occur. That is, when errors occur before new data are recorded after a corresponding memory block is electrically erased so as to change data recorded in a predetermined location, existing data are not left in the corresponding memory block, new data are not recorded in the corresponding memory block, and different data remain in the corresponding memory block. However, an existing file system cannot master this situation caused by the non-atomic characteristics.

Thus, a flash translation layer (FTL) which is a software unit for mapping blocks so that a file system can use a flash memory as a block unit such as a hard disc, is required. A layer 100 of a file system for a flash memory including an FTL is schematically shown in FIG. 1.

When a file system 110 provides information on a logical location of a corresponding file to an FTL 120, the FTL 120 translates the information on the logical location provided by the file system 110 into information on a physical location of the corresponding file using mapping information. Also, when the FTL 120 requests a device driver 130 to work on the corresponding file using the information on the physical location of the corresponding file, the device driver 130 performs an operation on a file recorded in a flash memory 140 using the information on the physical location of the corresponding file.

The flash memory 140 has a structure composed of blocks and pages. The sizes of a block and a page may be determined by each product using the flash memory. As an example, a flash memory having a size of 16 megabytes, a block size of 16 kilobytes, and a page size of 512 bytes includes 1024 blocks, and each of the blocks includes 32 pages. In this case, recording and reading of data is performed in units of pages, and electrical erasure is executed in units of blocks.

However, as the capacity of the flash memory becomes larger, the memory portion required to map blocks performed by the FTL increases.

The structure of a conventional flash memory is shown in FIG. 2A. A mapping table of data and mapping information of a data block is recorded in a flash memory 200. The mapping table is distributed over several blocks of the flash memory and includes a first mapping table 210, a second mapping table 220, a third mapping table 230, and a fourth mapping table 240. Likewise, since mapping information of a data block is distributed over several blocks of the flash memory, in order to read or write data, the entire mapping table should be made by adding a plurality of mapping tables distributed over the flash memory 200 to one another, as shown in FIG. 2B. Thus, in order to perform a flash memory operation in the prior art, the entire mapping table should be made such that an operational time is delayed. Also, since mapping information of all data should be included in the mapping table, the size of the mapping table increases, thereby wasting a large portion of the flash memory.

Each block in the flash memory wherein data can be recorded has a limited life span. The life span has a close relationship with the number of electrical erasures executed in each block. That is, when the number of electrical erasures increases over a predetermined number, problems may occur when data are recorded. The number of electrical erasures is generally limited to a hundred thousand through a million and determined by each product using the flash memory.

When electrical erasures are executed repeatedly only in a particular block, only the life span of the particular block is shortened, and thus, data cannot be recorded in that block any more. Thus, a method for leveling the wear of blocks in a flash memory, by which electrical erasures are prevented from being repeatedly executed only in a particular block and performed uniformly in all blocks such that the life spans of all blocks are the same, has been proposed.

In an existing method for leveling the wear of blocks in a flash memory, information on the number of electrical erasures in all data blocks of the flash memory is maintained in each data block of the flash memory, thereby causing a waste of memory capacity, making it difficult to manage the memory, and causing functional overhead.

SUMMARY OF THE INVENTION

The present invention provides a method for managing a flash memory, a method for writing data in a flash memory, a method for reading data from a flash memory, by which the required capacity of the memory is reduced and an operational time of a system is reduced when a flash transition layer (Fit) is implemented, and a flash memory using the same.

According to an aspect of the present invention, there is provided a method for managing a flash memory. In the method, if changing of data of a data block recorded in a data area is requested, recording the data block having changed data in an alternative area and recording mapping information representing an address of the data block recorded in the alternative area in a mapping area, and if changing of data of the data block recorded in the alternative area is requested, recording a data block having changed data in the data area and deleting the mapping information representing the address recorded in the alternative area from the mapping area. If the mapping information on the data block exists in the mapping area, data is read from the data block in the alterative area, and if the mapping information on the data block does not exist in the mapping area, data is read from the data block at the original address in the data area.

Preferably, the mapping information is a logical block number of the data block.

Preferably, if the changed data of the data block are recorded in the alternative area, the changed data are recorded in a temporary block of the alternative area.

Preferably, if the changed data of the data block are recorded in the data block, the changed data are recorded in a location of the data area corresponding to the logical block number of the data block.

According to another aspect of the present invention, there is provided a method for writing data in a flash memory which comprises a data area, in which changed data of a data block recorded in an alternative area are recorded, an alternative area, in which the changed data of the data block recorded in the data area are recorded, and a mapping area containing mapping information of the data block included in the alternative area. The method comprises receiving a data block write request in the flash memory, searching mapping information on the data block to be requested to write in the mapping area, if there is no mapping information on the data block to be requested to write, writing the data block to be requested to write in the alternative area and recording the mapping information on the data block in the mapping area, and if there is mapping information on the data block to be requested to write, writing the data block to be requested to write in the data area and deleting the mapping information on the data block to be requested to write from the mapping area.

According to another aspect of the present invention, there is provided a method for reading data from a flash memory which comprises a data area, in which changed data of a data block recorded in an alternative area are recorded, an alternative area, in which the changed data of the data block recorded in the data area are recorded, and a mapping area containing mapping information of the data block included in the alternative area. The method comprises receiving a data block read request in a flash memory, searching mapping information on the data block to be requested to read in the mapping area; if there is no mapping information on the data block to be requested to read, reading the data block to be requested to read from the data area; if there is mapping information on the data block to be requested to read, reading the data block to be requested to read from the alternative area.

According to another aspect of the present invention, there is provided a flash memory. The flash memory includes a data area in which changed data of a data block are recorded when changing of data of a data block recorded in an alternative area is requested, an alternative area in which the changed data of the data block are recorded when changing of data of a data block recorded in the data area is requested, and a mapping area in which a mapping table containing mapping information of the data block recorded in the alternative area is recorded and from which the mapping information of the data block is removed when the changed data of data block are recorded in the data area.

Preferably, the method further comprises a master block containing information on the data area, the alternative area, and the mapping area.

Preferably, a physical block number of the data block existing in the data area corresponds to a logical block number on a one-to-one basis.

Preferably, the alternative area includes a predetermined number of blocks, each of the blocks includes a predetermined number of pages, and a first mapping table is recorded in a first page of a first block, and a second table, in which the contents of the first mapping table are changed, is recorded in a second page of the first block, and if all of the pages of the first block are recorded, an n-th mapping table is recorded in a first page of a second block.

BRIEF DESCRIPTION OF THE DRAWINGS

The above and other aspects and advantages of the present invention will become more apparent by describing in detail preferred embodiments thereof with reference to the attached drawings in which:

FIG. 3 illustrates a flash memory according to the present invention;

FIGS. 4A and 4B illustrate a data updating operation in the flash memory shown in FIG. 3;

FIG. 5 illustrates a mapping table according to the present invention;

FIGS. 6A and 6B illustrate a method for recording mapping tables in the flash memory shown in FIG. 3;

DETAILED DESCRIPTION OF THE INVENTION

Figure 1:
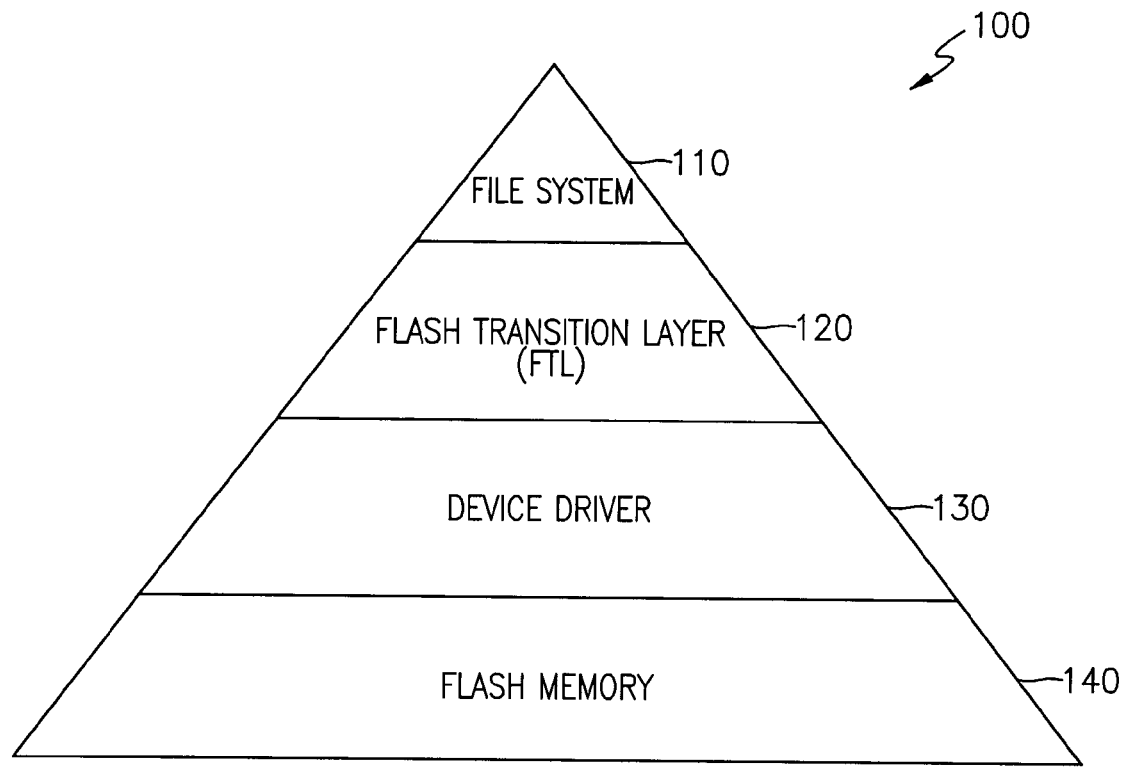
FIG. 1 illustrates layers of a file system for a flash memory.
Figure 2A:
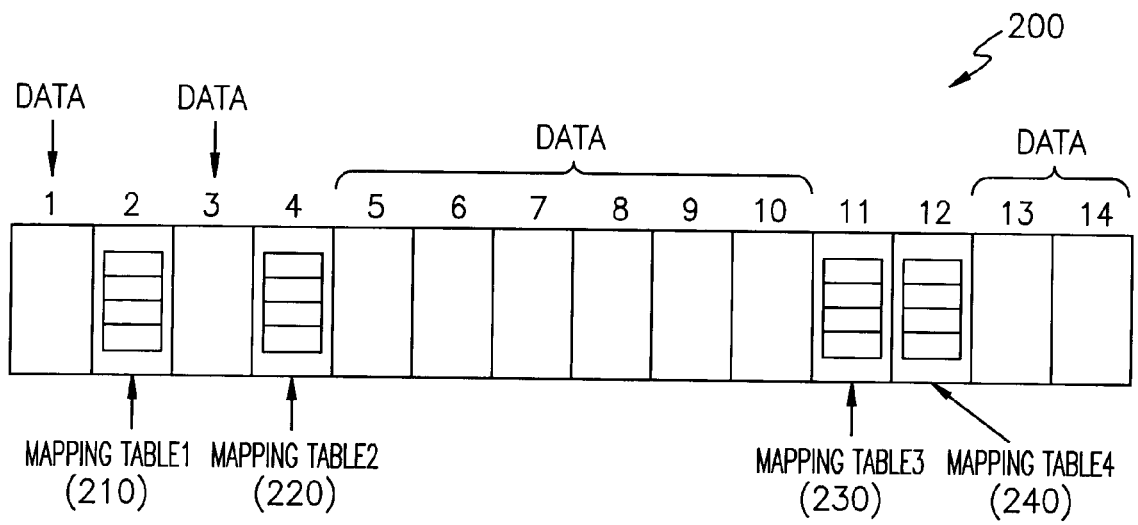
FIG. 2A illustrates a flash memory in which mapping tables and data are stored according to the prior art.
Figure 2B:
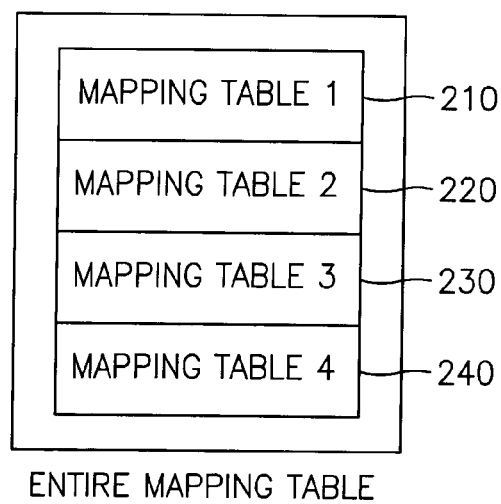
FIG. 2B illustrate a mapping table in the prior art.

Hereinafter, the present invention will be described in detail with reference to the accompanying drawings.

The structure of a flash memory 300 according to the present invention is shown in FIG. 3. The flash memory 300 includes a master block 310, a mapping area 320, a data area 330, and an alternative area 340. As shown in FIG. 3, when the flash memory 200 includes n blocks, the flash memory includes a master block occupying one block, a mapping area occupying two blocks, an alternative area occupying s blocks, and a data area occupying n-s-3 blocks.

Also, a physical block number indicative of a physical location of the flash memory is from 0, which is a starting location of the flash memory, to n−1, and a logical block number indicative of an address of a data area in which actual valid data are recorded is from 0, which is a starting location of the data area, to n-s−4. In the present embodiment, the logical block number and the physical block number are in a one-to-one correspondence. For example, a logical block number 0 corresponds to a physical block number 3.

The master block 310 is placed in the physical block number 0 and has a table by which the locations and sizes of a mapping area, a data area, and an alternative area are defined. In particular, when there are bad blocks in the memory 300, information on the bad blocks is recorded in the master block 310, and the master block 310 with the information on the bad blocks properly excludes the bad blocks.

The mapping area 320 is placed in physical block numbers 1 and 2 and has a table by which mapping information on each block existing in the alternative area 340 is recorded. Although the mapping area 320 in two blocks is shown in FIG. 3, the mapping area 320 is not limited to these two blocks. The mapping area 320 is not distributed over several locations of the flash memory but in a predetermined location, i.e., behind the master block 310. Thus, the entire flash memory does not need to be checked so as to find a mapping table.

Data are recorded in the data area 330 and the alternative area 340. That is, data are initially recorded in the data area 330, recorded in the alternative area 340 when the data recorded in the data area 330 is changed, and recorded in the data area 330 when the data recorded in the alternative area 340 is changed again. The data area 330 and the alternative area 340 shown in FIG. 3 include n-s−3 blocks and s blocks, respectively.

Physical block numbers of each block existing in the data area 330 correspond to logical block numbers in a one-to-one correspondence. Thus, an additional mapping table for mapping logical block numbers to physical block numbers is not needed, and logical block numbers can be changed by performing a simple operation on physical block numbers. When new data are recorded in a block placed in the data area 330, the new data are recorded at an unused page. Meanwhile, when existing data recorded in the block placed in the data area 330 are changed, changed contents should be recorded not in an original block but in an additional block. When at least one of the pages contained in the block is changed, the entire block is recorded again. In this case, one block among s blocks of the alternative area 340 is selected and recorded. Also, information on blocks existing in the alternative area 340 is managed by a mapping table. When data of the block placed in the alternative area 340 is changed again, a corresponding block is recorded in the original block placed in the data area 330.

Also, atomic write is supported as many times as the number of blocks contained in the alternative area 340. That is, when five blocks are contained in the alternative area 340, atomic write can be supported as many times as the five blocks.

An example of a method for alternatively mapping blocks according to the present invention will be described with reference to FIGS. 4A and 4B.

As shown in FIG. 4A, a logical block number 0 is placed in a physical block number 3, and a logical block number 3 is placed in a physical block number 6. When changing of data recorded in the logical block number 0 is requested, a data block having changed data of the logical block number 0 is recorded in one block of the alternative area 340, i.e., in a physical block number n-s, and location information on the physical block number n-s is recorded in the mapping table existing in the mapping area 320. When changing of data recorded in the logical block number 3 is requested, a data block having changed data of the logical block number 3 is recorded in one block of the alternative area 340, i.e., in a physical block number n-s+1, and location information on the physical block number n-s+1 is recorded in the mapping table existing in the mapping area 320. When changing of data existing in the data area 330 is requested and are recorded in the alternative area 340, blocks of changed contents may be placed in any block among s blocks of the alternative area 340.

Subsequently, when changing of data having the logical block number 0 placed in the alternative area 340 is requested, as shown in FIG. 4B, a data block having changed data of the logical block number 0 is recorded in the physical block number 3 of the data area 330, and location information of the corresponding alternative area 340 is deleted from a mapping table.

The structure of a mapping table 500 by which the method for alternatively mapping blocks according to the present invention is performed, will be described below with reference to FIG. 5.

Location information on which each of the logical blocks is placed in the s blocks existing in the alternative area 340 is recorded in the mapping table 500. When an initial state of the mapping table 500, i.e., blocks of the alternative area 340, are not used, mapping information of a corresponding block becomes −1. When the mapping information has valid data, the data have corresponding logical block number or physical block number. In an initial state, all of mapping information of the mapping table 500 become −1.

An example of an updating operation of a mapping table by which the method for alternatively mapping blocks according to the present invention is performed, will be described with reference to FIGS. 6A and 6B.

The mapping table is recorded in a physical block number 1 or 2. As shown in FIG. 6A, in an initial state, a first page of the physical block number 1 is recorded in the mapping table. When a data write operation is performed and simultaneously the mapping table is changed, a new mapping table is recorded in a second page of the physical block number 1. Also, as shown in FIG. 6B, when a data write operation is performed several times and there is no more page to be recorded in the mapping table, a last mapping table is recorded in the physical block number 2, and the physical block number 1 performs electrical erasure.

Figure 7:
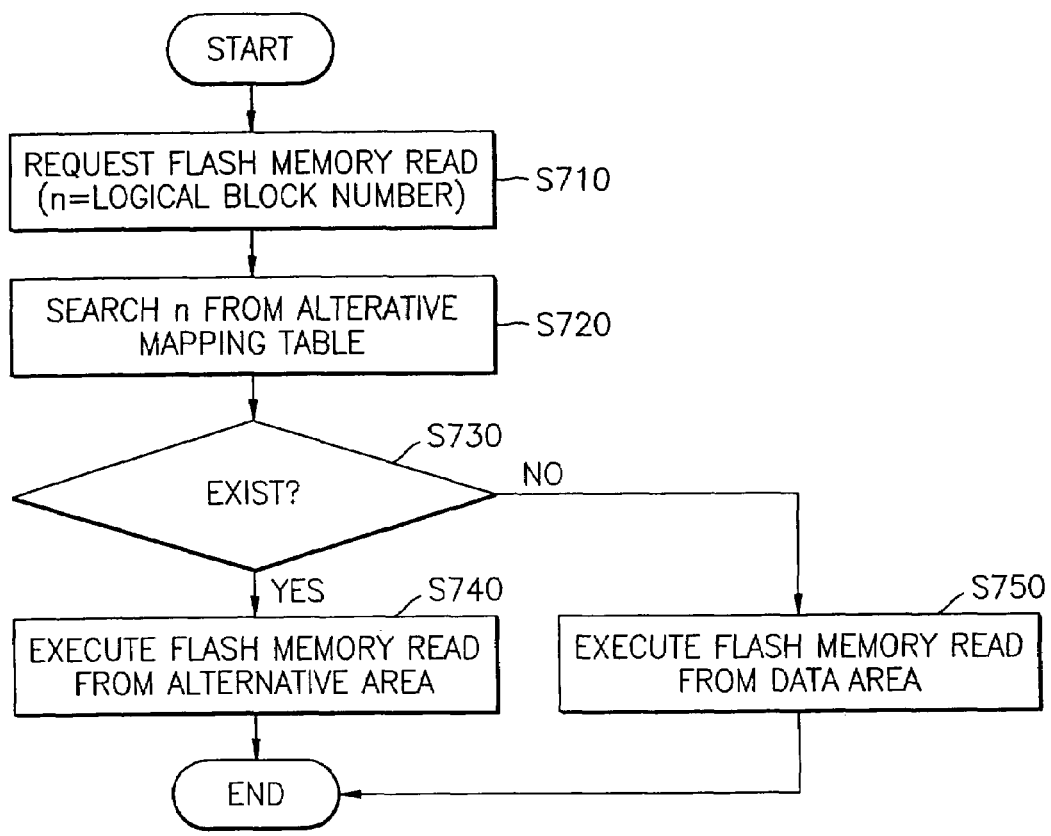
FIG. 7 shows a flowchart illustrating a method for reading data from a flash memory according to the present invention.

A read operation using the method for alternatively mapping blocks according to the present invention will be described with reference to FIG. 7.

In step S710, if read on a logical block number n of a flash memory is requested, in step S720, it is checked whether the logical block number n exists in a mapping table existing in a mapping area. In step S730, if the logical block number n exists in the mapping table, in step S740, read is executed from a corresponding block of an alternative area. If the logical block number n does not exist in the mapping table, in step S750, read is executed from a corresponding block of a data area.

Figure 8:
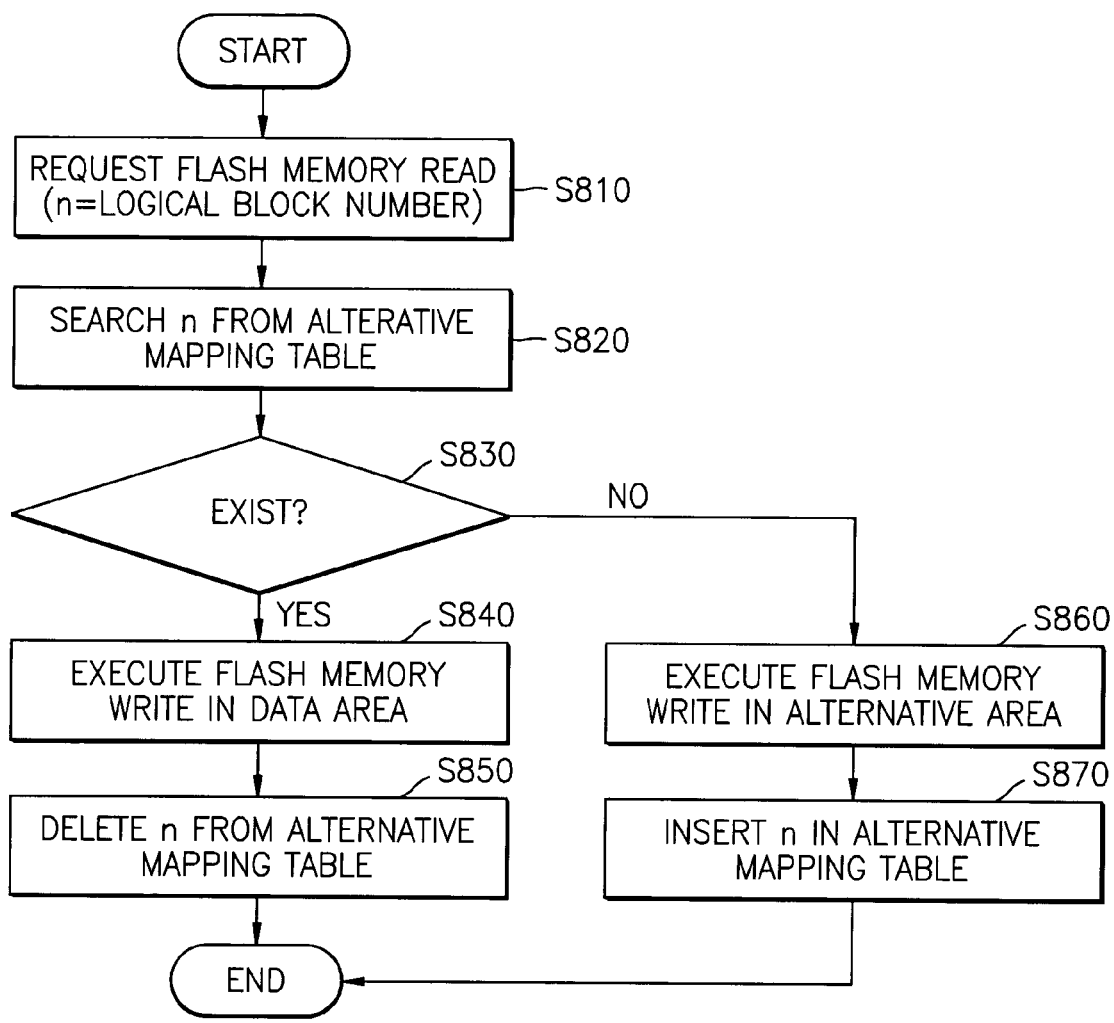
FIG. 8 shows a flowchart illustrating a method for writing data in a flash memory according to the present invention.

A write operation using the method for alternatively mapping blocks according to the present invention will be described with reference to FIG. 8.

In step S810, if a flash memory write on a logical block number n is requested, in step S820, it is checked whether the logical block number n exists in a mapping table existing in a mapping area. In step S830, if the logical block number n exists in the mapping table, in step S840, write is executed in a corresponding block of a data area. Since there is no more corresponding block in an alternative area, in step S850, the logical block number n is deleted from the mapping table. If the logical block number n does not exist in the mapping table, in step S860, flash write is executed in an unused temporary block of the alternative area, and in step S870, the logical block number n is recorded in the mapping table.

In a method for leveling the wear of blocks in a flash memory according to the present invention, information on the wear of blocks that have been progressed from first usage is not maintained in the flash memory, but only information on the number of electrical erasures that have been executed after a file system starts is maintained in a random access memory (RAM), and leveling of the wear of blocks for the flash memory is executed. The number of electrical erasures on recently-used n blocks among blocks on which electrical erasure is executed after the file system starts based on a predetermined time period is maintained in the RAM as a list. The wear of all physical blocks that are not registered in a wear leveling list is regarded as 0. As an example, a segmented least recently used (SLRU) list may be used as the wear leveling list.

Figure 9:
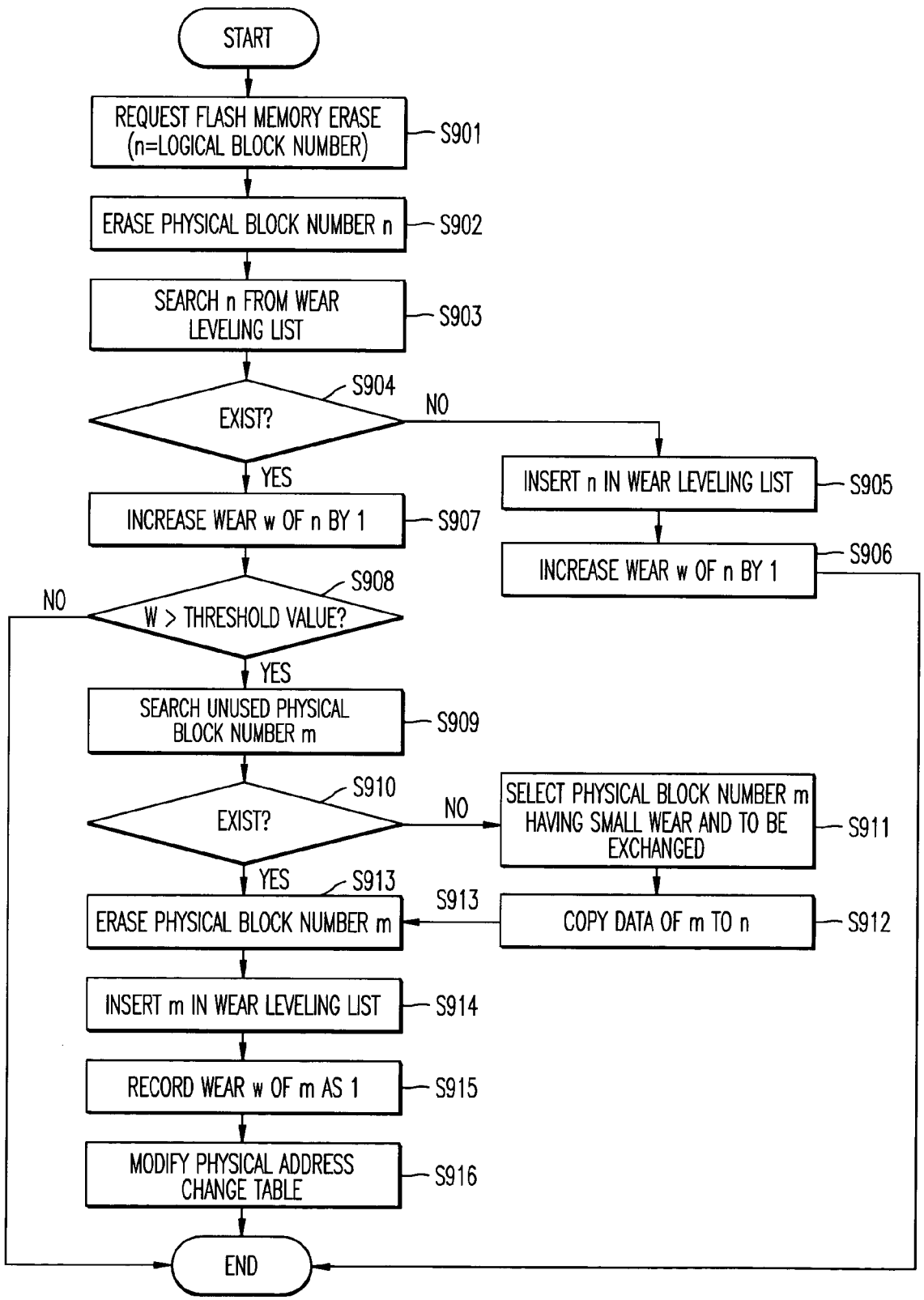
FIG. 9 shows a flowchart illustrating a method for leveling the wear of blocks in a flash memory according to the present invention.

A method for leveling the wear of blocks in a flash memory according to the present invention will be described with reference to FIG. 9.

In step S901, if a flash memory erasure on a physical block number n is requested, in step S902, electrical erasure on the corresponding physical block number n is executed. In step S903, it is checked whether n exists in a wear leveling list.

If n does not exist in the wear leveling list in step S904, in step S905, n is inserted to the wear leveling list, and in step S906, the wear w of n is increased by 1, and this procedure is ended.

If n exists in the wear leveling list in step S904, the wear w of n is increased by 1 in step S907, and in step S908, it is determined whether w is greater than a threshold value.

If w is not greater than the threshold value in step S908, this procedure is ended. If w is greater than the threshold value in step S908, n is not recorded in the wear leveling list, and in step S909, an unused physical block number m is searched.

If the unused physical block number m exists in the wear leveling list in step S910, in step S913, the physical block number m is erased. If the unused physical block number m does not exist in the wear leveling list, in step S911, a physical block number m that is not registered in the wear leveling list is temporarily selected.

In step S912, data of m is copied to n, and then, in step S913, the physical block number m is erased.

In step S914, m is inserted in the wear leveling list, and in step S915, the wear w of m is recorded as 1, and in step S916, a physical address change table is modified.

Figure 12:
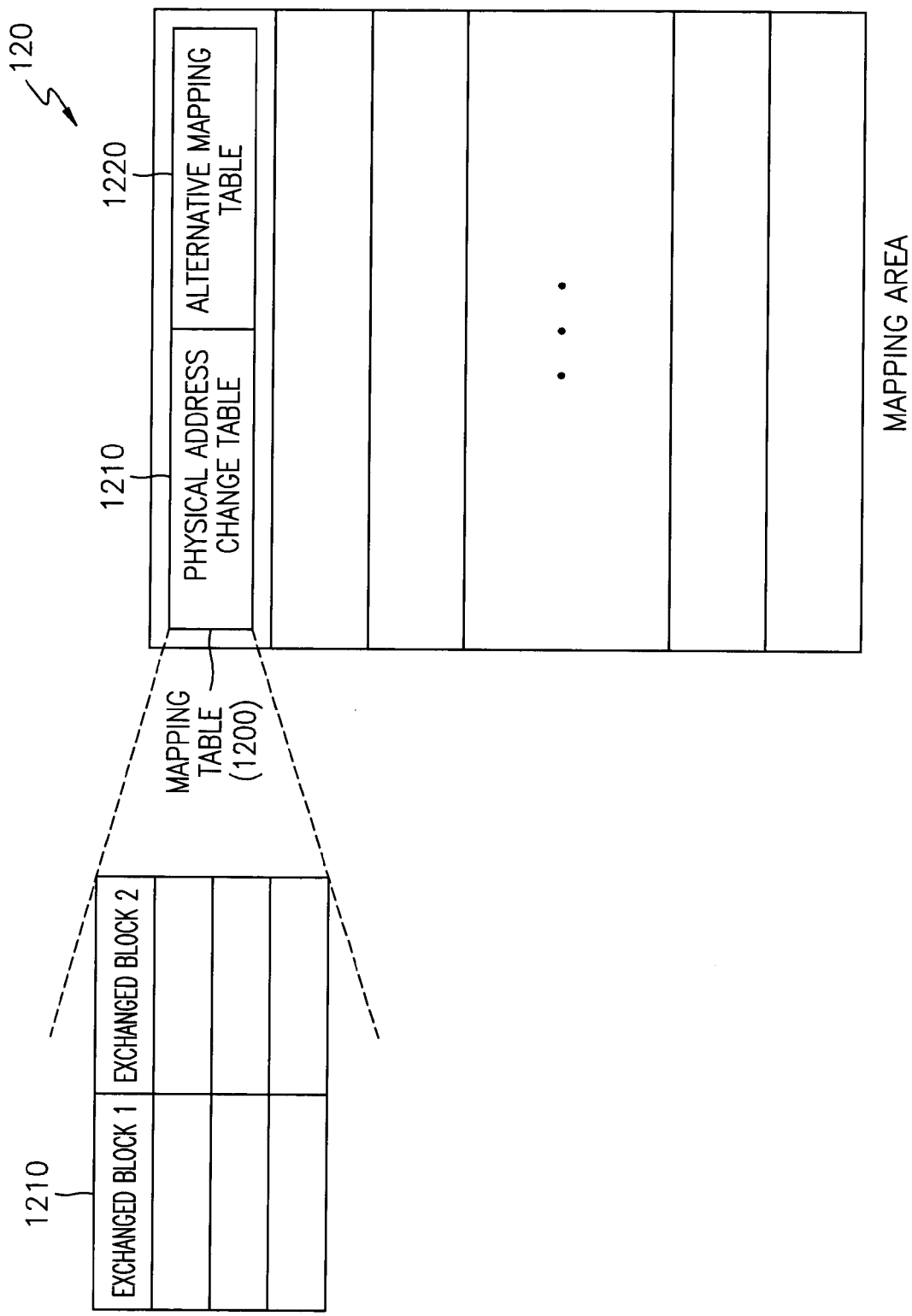
FIG. 12 illustrates a mapping area in which a physical address change table is stored according to the present invention.

In this way, when the wear of physical blocks exceeds the threshold value, write is executed in unused blocks, or blocks having small wear among used blocks are exchanged, and the physical locations of blocks are changed, and thus, information on the locations of exchanged blocks should be recorded. Thus, a physical address change table as well as an alternatively mapping table needs to be stored at each page of a mapping area. For example, as shown in FIG. 12, each page of the mapping area includes a physical address change table 1210 and an alternative mapping table 1220. The physical address change table 1210 has information on exchange blocks.

For example, an operation when an unused physical block number 7 exists in the wear leveling list, will be described with reference to FIGS. 10A and 10B.

Figure 10A:
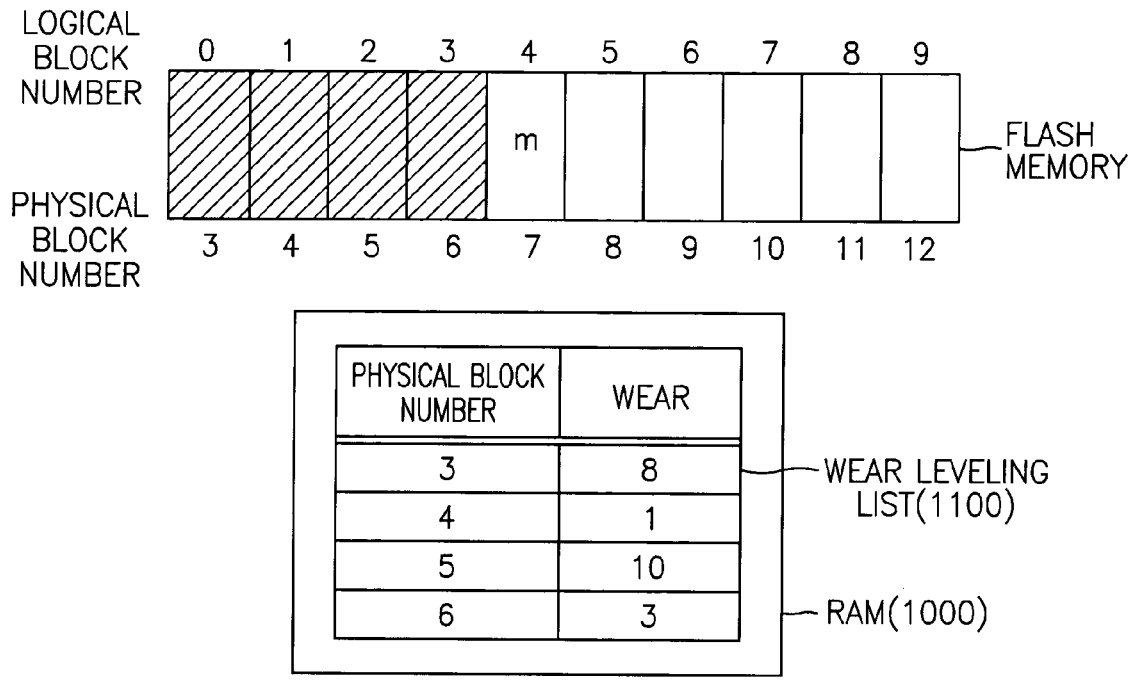
FIGS. 10A and 10B illustrate a memory and a RAM for leveling the wear of blocks in a flash memory according to the present invention.
Figure 10B:
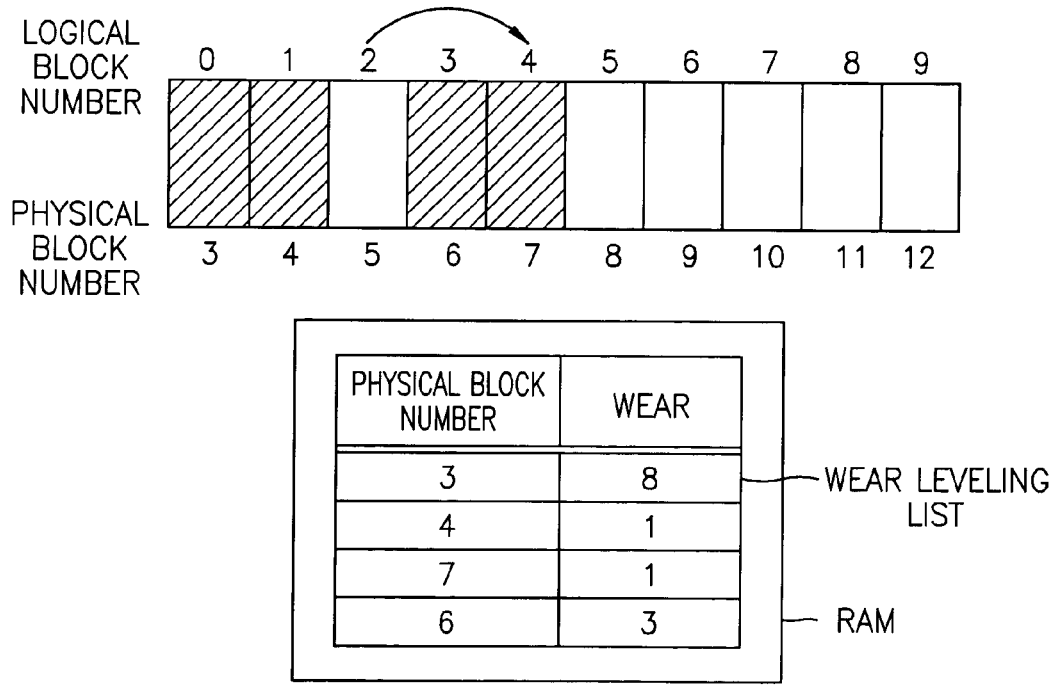

As shown in FIGS. 10A and 10B, when the length of the wear leveling list is 4, a list of four recently-used blocks among blocks on which electrical erasure is performed can be maintained. As shown in FIG. 10A, physical block numbers 3 through 6 of flash memory are used, and physical block numbers 7 though 12 are not used, and wear on the physical block numbers 3 through 6 is recorded in the wear leveling list stored in the RAM. When a threshold value of wear is 10, if electrical erasure on the physical block number 5 is requested, the contents of the physical block number 5 are erased, and the threshold value is checked. As a result, the wear of the physical block number 5 is 11, and thus exceeds the threshold value. Thus, as shown in FIG. 10B, the unused physical block number 7 is searched, the contents of the physical block number 7 are erased, and the physical block number 7 is inserted in the wear leveling list. Since electrical erasure is performed once on the physical block number 7, the wear of the physical block number 7 is recorded as 1. In this case, information on which the contents of a logical block number 2 are mapped to the physical block number 7 can be recorded by implementing an additional physical address change table.

Next, an operation when unused physical blocks do not exist in the wear leveling list, will be described with reference to FIGS. 11A and 11B.

Figure 11A:
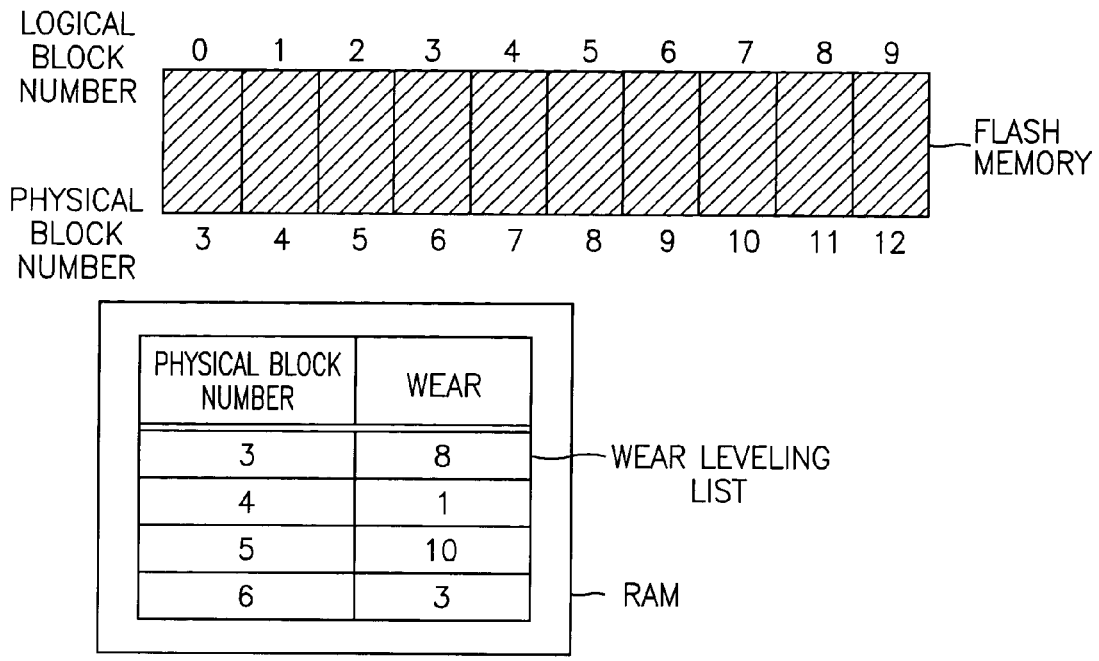
FIGS. 11A and 11B illustrate a memory and a RAM for leveling the wear of blocks in a flash memory according to the present invention.
Figure 11B:
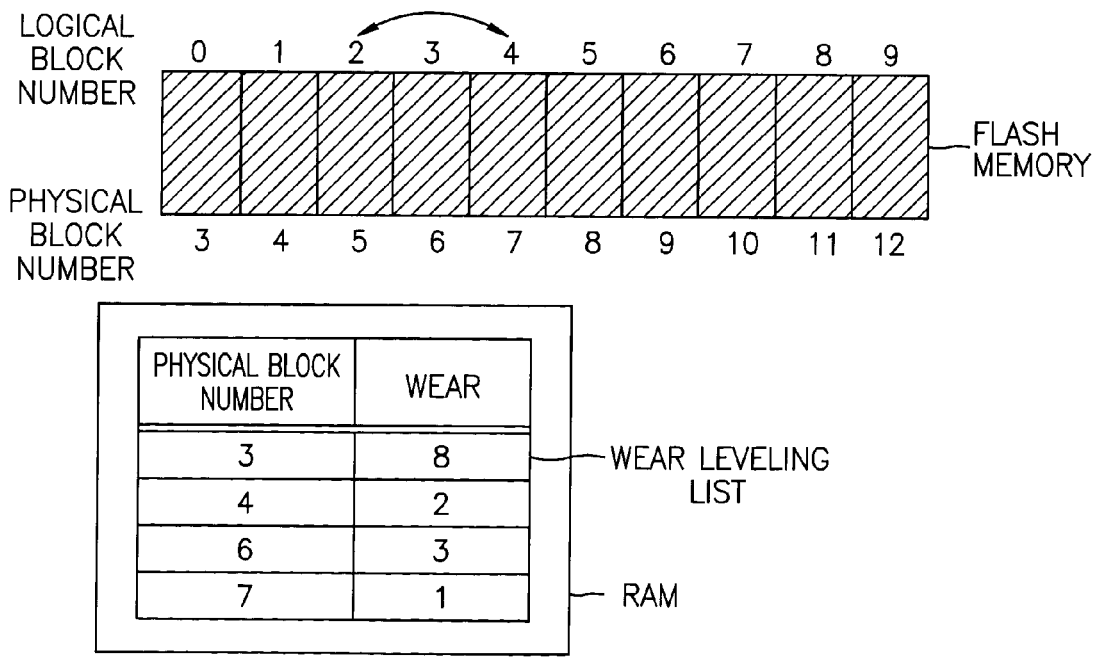

As shown in FIGS. 11A and 11B, when the length of the wear leveling list is 4, a list of recently-used four blocks among blocks on which electrical erasure is performed can be maintained. As shown in FIG. 11A, when physical block numbers 3 through 12 of flash memory are used, and wear on the physical block numbers 3 through 6 is recorded in the wear leveling list, if an electrical erasure of the physical block number 5 is requested, the contents of the physical block number 5 are erased, and the threshold value is checked. As a result, the wear of the physical block number 5 is 11, and thus exceeds the threshold value. Thus, as shown in FIG. 11B, a physical block number 7 having small wear and to be exchanged among physical block numbers is selected, data of the physical block number 7 are copied to the physical block number 5, and data of the physical block number 7 are erased. Then, the physical block number 7 is inserted in the wear leveling list, and the wear of the physical block number 7 is recorded as 1.

In the examples described in FIGS. 10A through 11B, although all blocks on which electrical erasure is executed are recorded in the wear leveling list, only a list of n recently-used blocks, the list based on a predetermined point in time among the blocks on which electrical erasure is executed, can be maintained.

An example of a file system for a flash memory according to the present invention will be described with reference to FIGS. 13A and 13B.

Figure 13A:
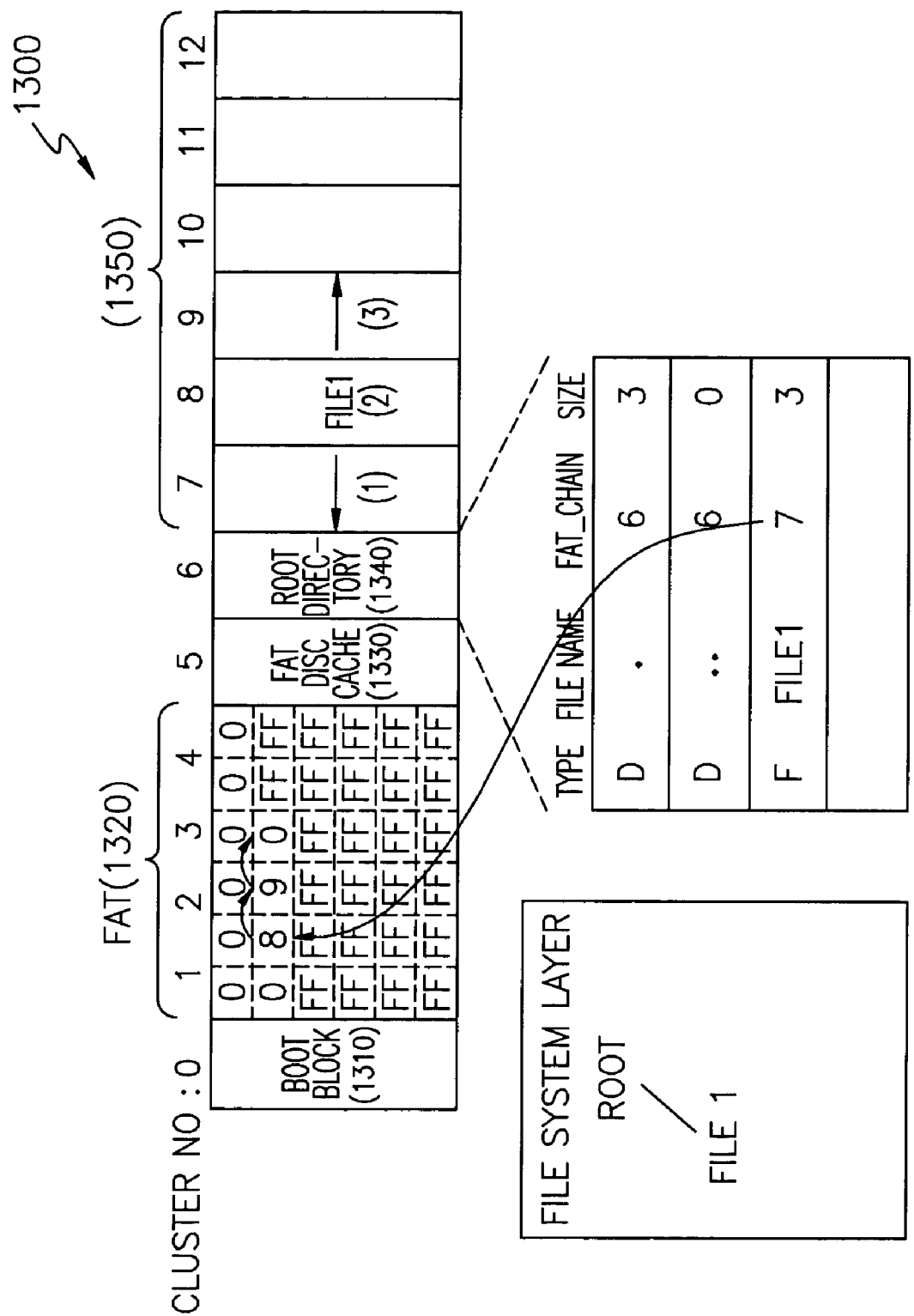
FIGS. 13A and 13B illustrate a method for changing clusters of a file system for a flash memory according to the present invention.

A file system 1300 shown in FIG. 13A includes a boot block 1310, a file allocation table (FAT) 1320, an FAT disc cache 1330, a root directory 1340, and a file 1350.

The boot block 1310 is placed in a zeroth sector of a zeroth cluster and has information on the size of clusters and the number of sectors, the number of sectors for each cluster, the number and size of a starting sector of an FAT, the number and size of a starting cluster of an FAT disc cache, and the number of a starting cluster of a root directory.

The FAT 1320 has entries corresponding to each of clusters of the file system. Zeroth through sixth entries corresponding to a root directory (sixth cluster) from a boot cluster (zeroth cluster) after formatting are 0, and the other entries are initialized as 0×FFFF. A case where the values of entries of the FAT 1320 are 0×FFFF means that corresponding clusters are not used. A case where the values of entries of the FAT 1320 are not 0×FFFF means that corresponding clusters are being used. The number of clusters in which a next cluster of a corresponding file is placed, is recorded in each of entries.

The FAT disc cache 1330 records the changed contents of the FAT 1320 as the size of 512 bytes. If the FAT disc cache 1330 is searched and a corresponding FAT sector exists whenever the FAT 1320 is read, the FAT disc cache 1330 reads the FAT 1320. If there is no FAT disc cache, the FAT 1320 is read from an FAT area.

If a directory is made, two items for "." and ". ." are basically generated in an entry of the root directory 1340. The item "." indicates a directory entry itself, and a field FAT_chain is set to the number of a cluster in which the field is stored. Also, in an initial state, a size field of the item "." is set to 2, and this indicates the number of files existing in the root directory 1340 and the number of directories. The item ". ." indicates a parent directory, and in particular, in the case of the root directory 1340, the item ". ." indicates itself.

When a file having the name of "file 1" is generated in the root directory 1340, an item for the file "file 1" is generated in the directory entry, and the number of a first cluster in which a file is stored, is recorded in the field FAT_chain, and the number of clusters allocated to the file is recorded in the size field. Also, the FAT 1320 is modified to reflect a cluster chain on the file "file 1".

For example, as shown in FIG. 13A, when the file "file 1" is recorded in seventh, eighth, and ninth clusters, an item on the file "file 1" is generated in the root directory 1340, and 7 which is the number of the first cluster of the file "file 1", is recorded in the field FAT_chain. Also, in the FAT area, 8 which is the number of a second cluster of the file "file 1", is recorded in a seventh entry, and 9 which is the number of a third cluster of the file "file 1", is recorded in an eighth entry, and 0 is recorded in a ninth entry so as to indicate the end of the file "file 1". In this way, each entry of the FAT 1320 has the chain number of a next cluster of a corresponding file, and this chain entry forms the field FAT_chain.

When the contents of the file "file 1" are changed, the changed contents are not recorded in an existing cluster but a new cluster is allocated to the file, and thus, the changed contents are recorded in the new cluster. If recording of the changed contents is completed in the new cluster, the number of an existing cluster is deleted from a cluster chain in the FAT area, and the new cluster is connected to the cluster chain.

Figure 13B:
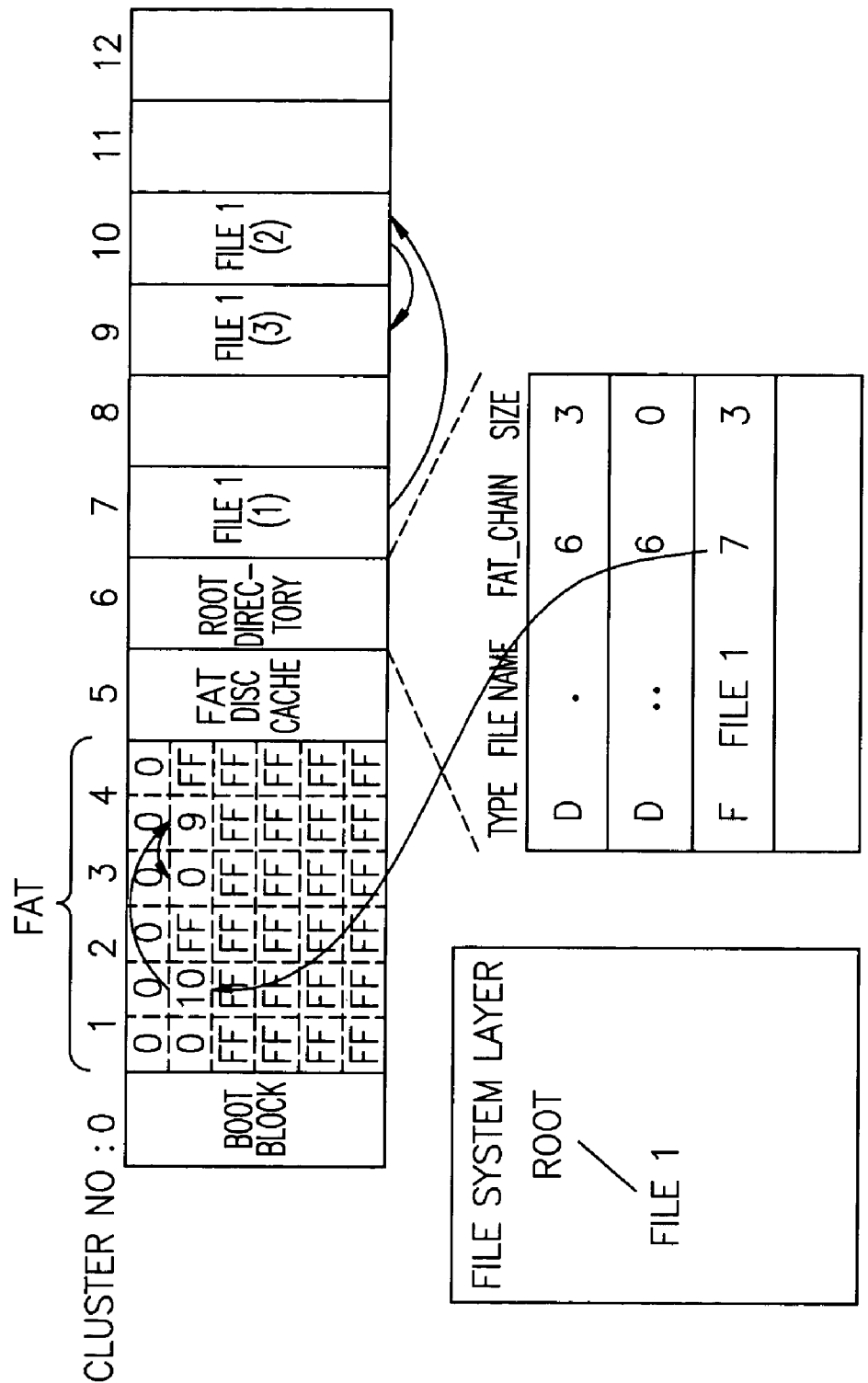

For example, as shown in FIG. 13B, when the contents of a second cluster of the file "file 1" are changed, the contents of the second cluster of the file 1 "file 1" are recorded in a new cluster 10. Also, in the FAT area, 10 which is the number of a second cluster of the file "file 1", is recorded in a seventh entry which is the number of a first cluster of the file "file 1", and 9 which is the number of a third cluster of the file "file 1", is recorded in a tenth entry, and 0 is recorded in a ninth entry so as to indicate the end of the file "file 1". Also, an eighth cluster is not used in an eighth entry, and thus, FF is recorded in the eighth entry.

In the method for changing clusters of the file system for a flash memory, recording of meta-data such as a directory or FAT is necessarily performed by atomic write performed by a flash transition layer (FTL). If errors occur when data are recorded in the new cluster, existing data are secured through an existing cluster chain, and if errors occur after a new field FAT_chain is recorded in the FAT, new data exist. On the other hand, recording of file data is performed by non-atomic write. This is because atomic restoration of file data is not needed on the conditions in which atomic restoration of a directory or FAT is secured. Thus, by using the method for changing clusters of the file system for a flash memory, the integrity of the file system is maintained, and simultaneously, optimized performances corresponding to non-atomic write are achieved.

Figure 14:
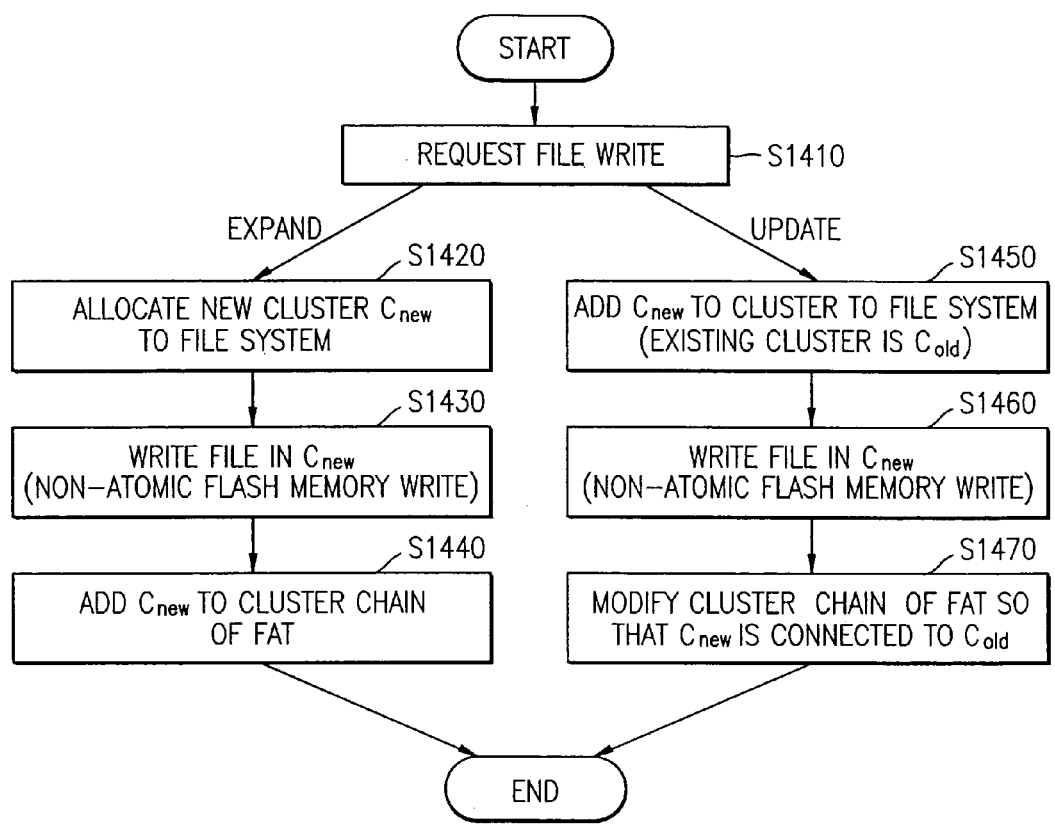
FIG. 14 shows a flowchart illustrating the step of writing files in the method for changing clusters of a file system for a flash memory according to the present invention.

Expansion and updating of files using the method for changing clusters of the file system for a flash memory according to the present invention will be described below with reference to FIG. 14.

In step S1410, if a file write is requested, that is, if write for expanding new contents is requested, in step S1420, a new cluster $C_{new}$ is allocated to a file system, and in step S1430, new file data is recorded by executing non-atomic write on the new cluster $C_{new}$. In step S1440, the new cluster $C_{new}$ is added to a cluster chain of the FAT by executing atomic write in the new cluster $C_{new}$.

If a file write is requested in step S1410, that is, if write for updating existing contents of the file is requested, in step S1450, an additional new cluster $C_{new}$ other than an existing cluster $C_{old}$ is allocated to the file system, and in step S1460, updated file data is recorded by executing non-atomic write in the new cluster $C_{new}$. Also, in step S1470, the cluster chain of the FAT is modified by executing atomic write in the new cluster $C_{new}$ so that the new cluster $C_{new}$ is connected to the existing cluster $C_{old}$.

As described above, in the method for alternatively mapping blocks performed by a flash transition layer (FTL) according to the present invention, since the memory portion required to map blocks in the flash memory is small, the capacity of the flash memory can be saved, information required to map blocks can be obtained without checking the entire flash memory such that a starting time of a file system can be reduced.

In addition, in the method for leveling the wear of blocks in a flash memory according to the present invention, since the wear of all blocks in the flash memory is uniform, memory management is easily performed, and since a wear leveling list is not recorded in the flash memory but in a random access memory (RAM), the capacity of the flash memory can be saved.

In addition, in the method for changing clusters of a file system for a flash memory according to the present invention, when data that do not need to be restored after errors occur other than meta-data are recorded, the data are excluded from a transaction such that the overall performances of the file system for the flash memory can be improved.

While this invention has been particularly shown and described with reference to preferred embodiments thereof, it will be understood by those skilled in the art that various changes in form and details may be made therein without departing from the spirit and scope of the invention as defined by the appended claims and equivalents thereof.

What is claimed is:

1. A method for managing a flash memory in which a mapping area, a data area and an alternative area are arranged sequentially therein, the method comprising:
    if changing of data of a data block recorded at an original address in the data area is requested, recording the data block having changed data in the alternative area and recording mapping information representing an address of the data block recorded in the alternative area in the mapping area; and
    if changing of data of the data block recorded in the alternative area is requested, recording a data block having changed data at the original address in the data area and deleting the mapping information representing the address of the data block recorded in the alternative area from the mapping area, wherein, if the mapping information on the data block exists in the mapping area, data is read from the data block in the alternative area, and if the mapping information on the data block does not exist in the mapping area, data is read from the data block at the original address in the data area.

2. The method of claim 1, wherein the mapping information is a logical block number of the data block.

3. The method of claim 1, wherein if the changed data of the data block are recorded in the alternative area, the changed data are recorded in a temporary block of the alternative area.

4. The method of claim 1, wherein if the changed data of the data block are recorded in the data area, the changed data are recorded in a location of the data area corresponding to a logical block number of the data block.

5. A method for writing data in a flash memory which comprises a mapping area, a data area and an alternative area arranged sequentially therein, the data area having an original address, in which changed data of a data block recorded in an alternative area are recorded, the alternative area, in which the changed data of the data block recorded at the original address in the data area are recorded, and the mapping area containing mapping information representing an address of the data block included in the alternative area, the method comprising:

receiving a data block write request in the flash memory;

searching mapping information on the data block to be requested to be written in the mapping area;

if there is no mapping information representing the address of the data block to be requested to be written, writing the data block to be requested to be written in the alternative area and recording the mapping information representing the address of the data block in the mapping area; and if there is mapping information representing the address of the data block to be requested to be written, writing the data block to be requested to be written in the original address of the data area and deleting the mapping information representing the address of the data block to be requested to be written from the mapping area, wherein, if the mapping information on the data block exists in the mapping area, data is read from the data block in the alternative area, and if the mapping information on the data block does not exist in the mapping area, data is read from the data block at the original address in the data area.

6. A method for reading data from a flash memory which comprises a mapping area, data area and an alternative area arranged sequentially therein, the data area having an original address, in which changed data of a data block recorded in an alternative area are recorded, the alternative area, in which the changed data of the data block recorded at the original address in the data area are recorded, and the mapping area containing mapping information representing an address of the data block included in the alternative area, the method comprising:

receiving a data block read request in the flash memory;

searching mapping information on the data block to be requested to be read in the mapping area;

if there is no mapping information representing the address of the data block to be requested to be read, reading the data block to be requested to be read from the original address of the data area; and if there is mapping information representing the address of the data block to be requested to be read, reading the data block to be requested to be read from the alternative area, wherein, if the mapping information on the data block exists in the mapping area, data is read from the data block in the alternative area, and if the mapping information on the data block does not exist in the mapping area, data is read from the data block at the original address in the data area.

7. A flash memory comprising:

a data area having an original address, in which changed data of a data block are recorded when changing of data of a data block recorded in an alternative area is requested;

the alternative area in which the changed data of the data block are recorded when changing of data of the data block recorded in the original address of the data area is requested; and a mapping area in which a mapping table containing mapping information representing an address of the data block recorded in the alternative area is recorded and from which the mapping information representing the address of the data block is removed when the changed data of the data block are recorded in the original address of the data area, wherein the mapping area, the data area and the alternative area are arranged sequentially, and wherein, if the mapping information on the data block exists in the mapping area, data is read from the data block in the alternative area, and if the mapping information on the data block does not exist in the mapping area, data is read from the data block at the original address in the data area.

8. The memory of claim 7, further comprising a master block containing information on the data area, the alternative area, and the mapping area.

9. The memory of claim 7, wherein a physical block number of the data block existing in the data area corresponds to a logical block number on a one-to-one basis.

10. The memory of claim 7, wherein the alternative area includes a predetermined number of blocks, each of the blocks includes a predetermined number of pages, and a first mapping table is recorded in a first page of a first block, wherein, if contents of the first mapping table are changed, the changed contents are stored in a second table that is recorded in a second page of the first block, and if all of the pages of the first block have a mapping table recorded therein, a subsequent mapping table is recorded in a first page of a second block.

* * * * *